(12) United States Patent
Weigand et al.

(10) Patent No.: US 6,416,279 B1
(45) Date of Patent: Jul. 9, 2002

(54) COOLED GAS TURBINE COMPONENT WITH ADJUSTABLE COOLING

(75) Inventors: Bernhard Weigand; Klaus Semmler, both of Lauchringen; Conor Fitzsimons, Baden-Baden, all of (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/499,398

(22) Filed: Feb. 7, 2000

(30) Foreign Application Priority Data

Feb. 9, 1999 (EP) .............................................. 99810106

(51) Int. Cl.⁷ ................................................ F01D 1/00
(52) U.S. Cl. .......................... 416/39; 415/47; 415/115; 415/175
(58) Field of Search .......................... 415/12, 115, 175, 415/176, 47, 116; 416/39, 97 R, 97 A, 96 A

(56) References Cited

U.S. PATENT DOCUMENTS

| 4,526,512 A | | 7/1985 | Hook ........................ 416/96 A |
| 4,805,398 A | * | 2/1989 | Jourdain et al. .......... 415/47 X |
| 5,022,817 A | | 6/1991 | O'Halloran .................. 415/115 |
| 5,267,831 A | * | 12/1993 | Damiral .................. 415/175 X |
| 6,152,685 A | * | 11/2000 | Hagi ...................... 415/175 X |

* cited by examiner

*Primary Examiner*—John E. Ryznic
(74) *Attorney, Agent, or Firm*—Burns, Doane, Swecker & Mathis, L.L.P.

(57) ABSTRACT

At least one adjustable restricting point is introduced into the cooling air path of a coolable gas turbine component, and means which make it possible to change this restricting point during the operation of the machine are provided. In this way it is possible to adapt the amount of cooling air fed to the component continuously to the specific operating conditions.

9 Claims, 5 Drawing Sheets

Detail V

COOLED GAS TURBINE COMPONENT WITH ADJUSTABLE COOLING

FIELD OF THE INVENTION

The present invention concerns a coolable component of a gas turbine, which component has a hot gas flowing completely or partially around it during operation, which component is provided in its interior with at least one hollow space, through which hollow space a coolant flows during operation, which hollow space is connected to means for supplying the cooling medium and means for carrying away the cooling medium, which means form a flow path for the cooling medium. It also concerns a method of controlling the supply of cooling air, as well as a method of producing the component according to the invention.

BACKGROUND OF THE INVENTION

The high efficiency and the power density of modern heat engines require high temperatures of the operating fluids, which in many cases exceed the permissible material temperature of materials which can be commercially used. This applies in particular in gas turbine technology.

The currently customary thermodynamic states of the hot gas in gas turbines require efficient cooling of the components in contact with the hot gas. The thermally highly loaded components are in this case cooled either purely convectively or by a combination of convection cooling and film cooling.

The already compressed air taken from the process for cooling is at least partially lost from the operating process, which has adverse effects in particular on efficiency. On the other hand, inadequate cooling reduces the service life of the component considerably. The cooling of the particularly stressed guide blades of the first turbine stage of a gas turbine is therefore designed for the hottest temperature to be expected of the oncoming hot gas flow. At the same time, a circumferentially very inhomogeneous temperature field must be expected right at the combustion chamber exit. To ensure adequate cooling of the blades subjected to the highest loading in each case, other blades are supplied with significantly more cooling air than is necessary.

Furthermore, the very different operating conditions must also be taken into account. Even when an engine is being operated in part-load mode with reduced hot gas temperatures, the cooling air fraction remains largely constant, in other words significantly more cooling air is used up than would be necessary for maintaining adequate cooling. Similarly, engines are cooled independently of the actual load cycles, in such a way that the highest possible component service life is achieved in a base-load/full-load machine even when the operator would accept a shorter service life of the component in the interests of higher efficiency and higher effective output.

To sum up, it remains to be stated that, according to the prior art, the cooling of the thermally highly loaded components of a gas turbine takes place in accordance with a rigid regime. In this regime, the amount of cooling air tends to be overdimensioned at the expense of the efficiency of energy conversion. On the other hand, it would be desirable to vary and control the amount of cooling air according to the actual circumstances and the operating conditions.

SUMMARY OF THE INVENTION

This is where the invention comes in. The aim of the present invention is thus to specify a coolable component of a gas turbine, which component has a hot gas flowing completely or partially around it during operation, which component is provided in its interior with at least one hollow space, through which hollow space a coolant flows during operation, which hollow space is connected to means for supplying the cooling medium and means for carrying away the cooling medium, which means form a flow path for the cooling medium, and in the case of which component the cooling air fraction is variable.

This is achieved according to the invention by there being in the flow path at least one restricting point for the cooling medium, which is adjustable during the operation of the gas turbine.

Furthermore, the invention includes a method of controlling the amount of cooling air, as well as a method of producing the component according to the invention.

BRIEF DESCRIPTION OF THE DRAWINGS

The invention is explained in more detail below with reference to the drawing, in which specifically.

For the sake of better overall clarity, all details not directly essential for the invention have been omitted. Furthermore, the fact that the exemplary embodiment is restricted to turbine blades must not be understood in a restrictive sense. For an average person skilled in the art, the invention can be readily transferred to other cooled gas turbine components.

DETAILED DESCRIPTION OF THE INVENTION

Figure 1:
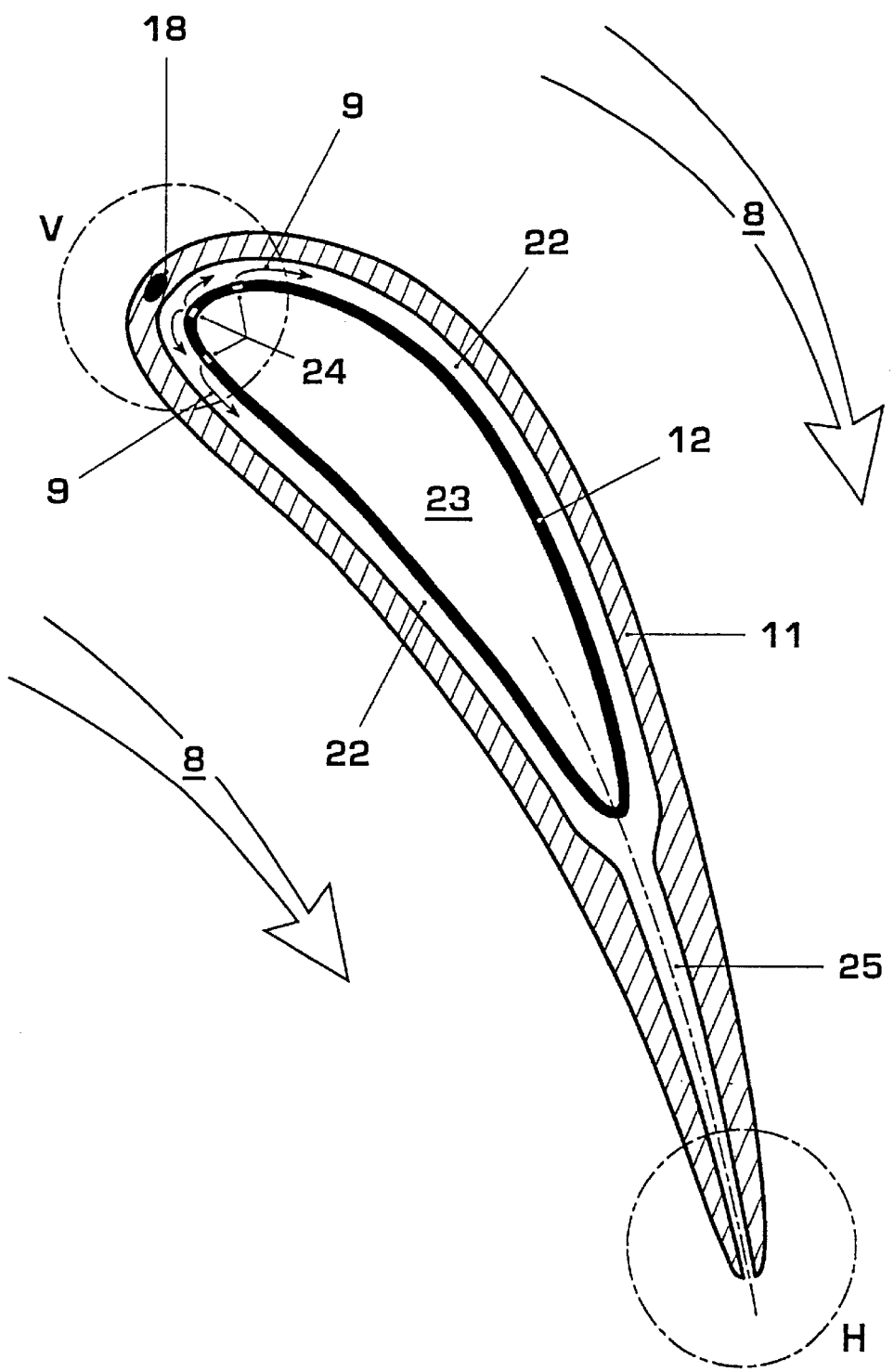
FIG. 1 shows a cross section through a convection-cooled turbine blade

FIG. 1 shows a purely convectively cooled turbine blade 11 in a hot gas flow 8, which encloses in its interior a hollow space in which cooling air is conducted. In this exemplary embodiment there is fitted into the hollow space an insert 12, which is designed in the form of a cooling baffle and divides the hollow space in the interior of the blade into a central space 23 and an outer space 22. In principle, the interior of the blade could also be shaped completely differently. Both the existence of the insert 12 and its shaping as a cooling baffle are in the first instance unessential for the invention and optional. Cooling air is fed from the blade root to the central hollow space 23. The cooling baffle 12 is provided in the region of the leading blade edge V with boreholes 24, in order to realize baffle cooling of the leading blade edge V, which is subjected to particularly high thermal loading. The cooling air exits from the central hollow space 23 through the boreholes 24 and impinges with high impact on the material of the blade 11 in the region of the leading edge V, whereby an improved heat transfer from the wall to the cooling air is achieved here. The cooling air gradually flows away through the outer space 22 and a channel 25 in the trailing blade edge H out of the hollow space in the interior of the blade, all the regions of the blade 11 being cooled.

Furthermore, the blade is provided at its leading edge V with a thermocouple 18. However, at this stage of implementing variable cooling this is not yet essential and only plays a part in connection with controlling the cooling air supply, to be explained below.

Figure 2:
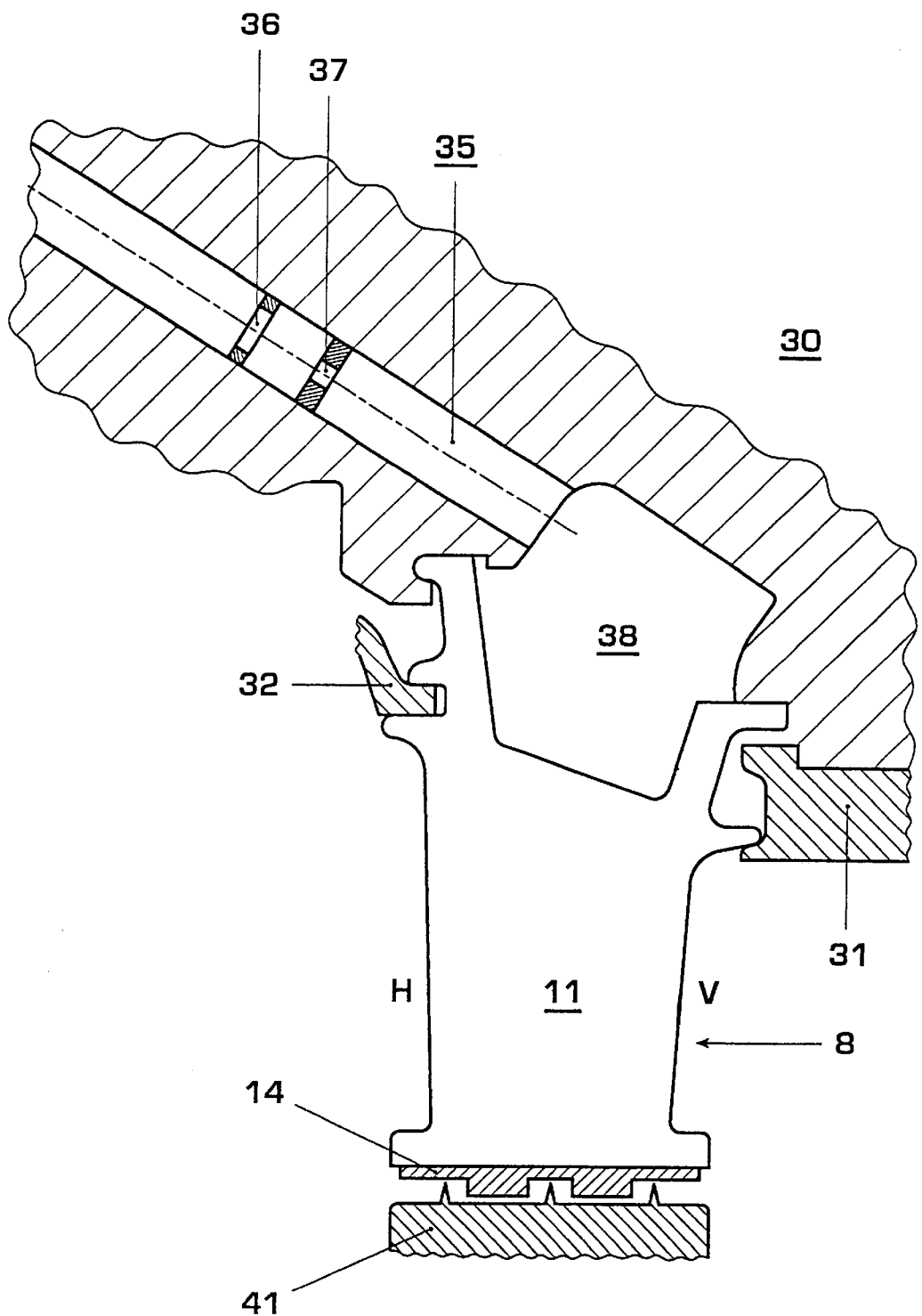
FIG. 2 shows an example of the cooling air supply of a turbine blade

In FIG. 2, the blade 11 is installed as a guide blade in the casing of a gas turbine. The blade head 14 forms with the sealing segment 41 a labyrinth seal. Heat build-up segments 31, 32 can be seen at the blade root. The cooling air is conducted via a supply line 35 and a cavity 38 into the hollow space (not shown here) in the interior of the blade. The amount of cooling air can be set by means of restricting points installed in the line 35, such as the diaphragm 37. According to the invention, the restricting point 37 is shaped in such a way that the free through-flow cross section can be varied, for example by being designed in the form of an externally adjustable iris diaphragm, whereby the amount of cooling air can be changed during operation. For this purpose, means (not shown here) which permit an adjustment of the restricting point externally during the operation of the gas turbine are also necessary. Such an adjustment could take place, for example, by mechanical or hydraulic means. The structural design of such an adjusting mechanism is not the subject of the present invention, however, for which reason no further comments or specifications of any kind are given here.

Optionally possible is the use of a further diaphragm 36, which serves as a measuring diaphragm for determining the mass flow of the cooling air.

Figure 3:
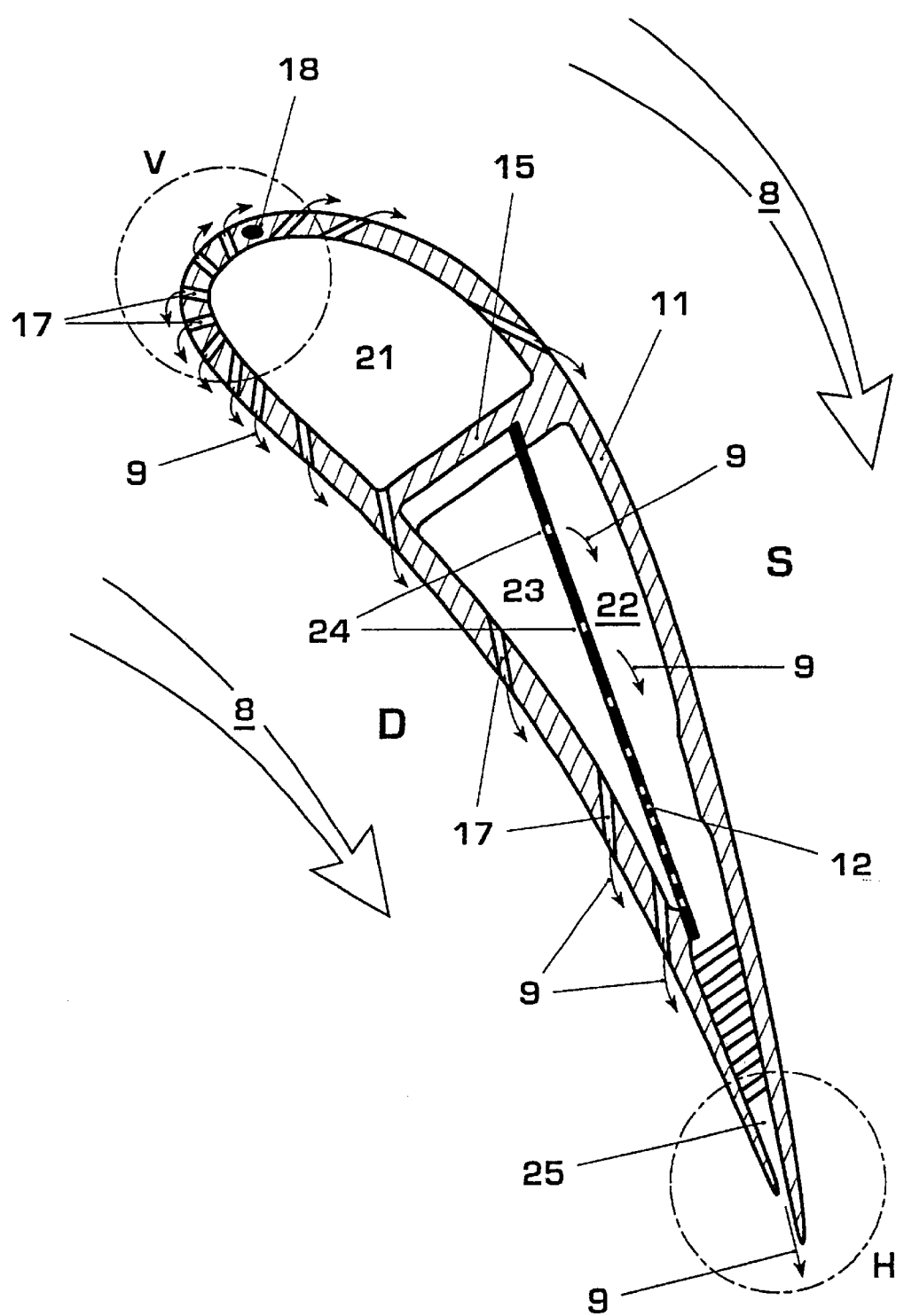
FIG. 3 shows a convectively cooled and film-cooled turbine blade

Represented in FIG. 3 is a cross section through a blade 11 cooled both convectively and by means of film cooling. Noticeable is the dividing cross-piece 15, which divides the-interior space of the blade in two. Downstream of the dividing cross-piece 15 there is a cooling baffle insert 12. Cooling air flows initially into the hollow space 23. Part of this cooling air 9 flows through the film-cooling holes 17 on the pressure side D of the blade to the outside of the blade, while a second fraction of the cooling air 9 flows at high velocity into the hollow space 22 through the boreholes 24 of the cooling baffle, insert 12 and cools the suction side S of the blade by baffle cooling, and finally flows away through a channel 25 at the trailing blade edge. The supply of the cooling air to the hollow space 23 takes place here in analogy with the representation in FIG. 2, it being possible for the amount of cooling air to be changed by means of the variable restricting point 37.

In the region of the leading blade edge V, on the other hand, pure film cooling is realized. In this case, the cooling air 9 flows through the hollow space 21 and the film-cooling holes 17 to the outside of the blade. On account of the existing pressure conditions, it is not readily possible to control the amount of cooling air by a variable restriction of the supply flow into the hollow space 21. Under some circumstances, the inlet pressure of the cooling air is only slightly greater than the pressure of the outside oncoming flow at the build-up point of the blade. A restriction of the flowing cooling air being supplied could cause an inrush of hot gas into the hollow space 21, which almost certainly leads to component failure. The variation of the amount of cooling air can thus take place only by variable restriction of the flow away out of the hollow space 21, that is to say a variable geometry of the film-cooling holes 17 in the region of the leading blade edge V.

Figure 4:
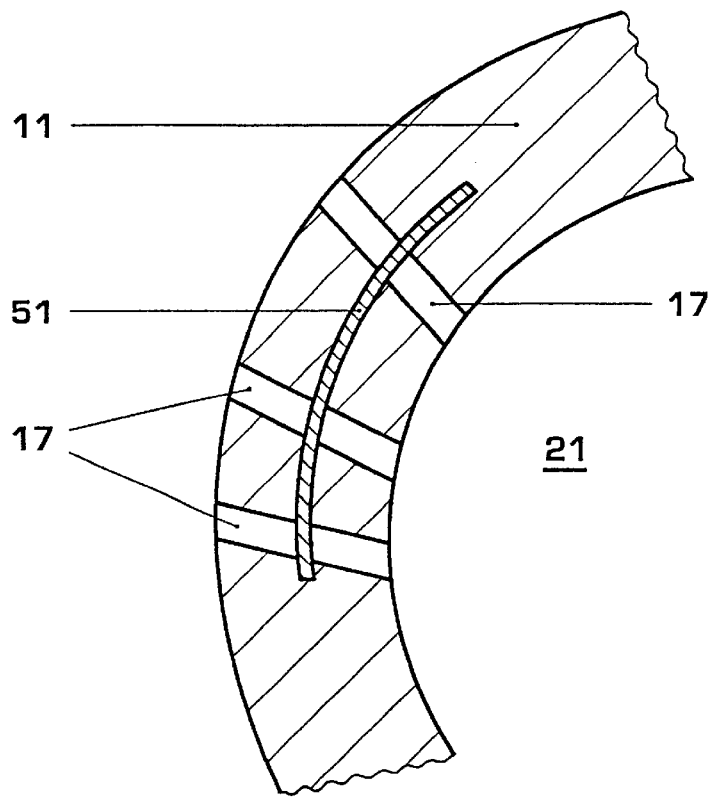
FIG. 4 shows a detail of the film-cooled leading edge of a turbine blade, with film-cooling holes which can be restricted in a variable manner.
Figure 5:
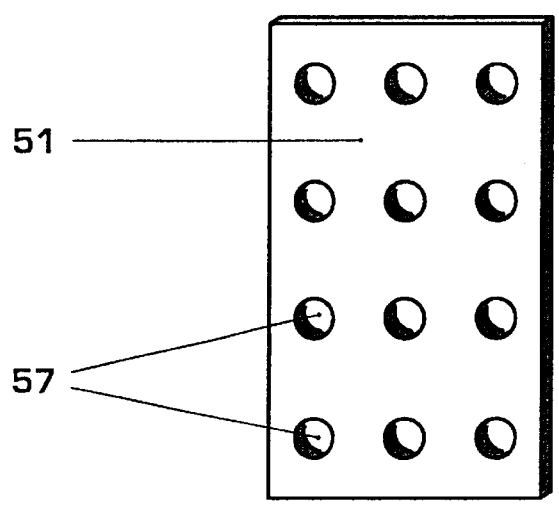
FIG. 5 is a plan view of a platelet in accordance with this invention.
Figure 6:
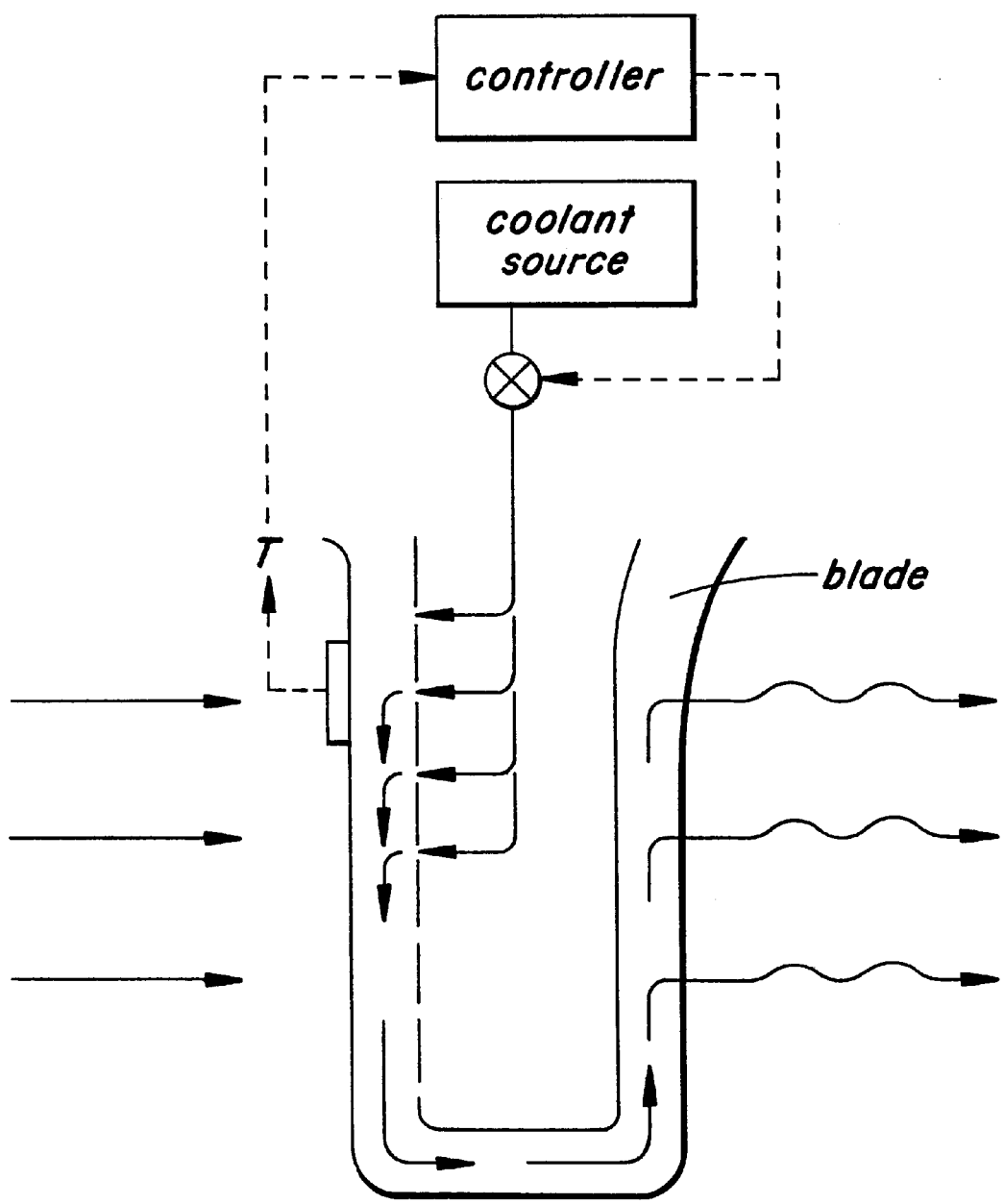
FIG. 6 is a schematic diagram of a preferred flow system.

This is represented in FIG. 4, which shows the leading blade edge V on a larger scale. Inserted into the material of the blade 11 is a platelet 51, which covers the film-cooling holes 17. As can be seen in FIG. 5, the platelet 51 is perforated. In this case, the arrangement of the boreholes 57 corresponds to that of the film-cooling holes 17 in the blade. By displacing the platelet 51 in relation to the blade 11, the holes 57 coincide fully or partially with the film-cooling holes 17, whereby different cross sections are cleared for the flowing away of the cooling air out of the hollow space 21. Consequently, variable restriction of the cooling air path is in turn realized and the possibility of changing the amount of cooling air is provided.

The production of a blade with restrictable film-cooling holes expediently takes place by eroding a thin slit into the blade before the film-cooling holes have been made in this blade. The platelet is inserted in a displaceable manner, with little play, into this slit. The film-cooling holes are then made in the blade and the platelet is introduced, in one operation.

Controlling the material temperature of the cooled components can be realized by means of the variable cooling air supply if the said components are equipped, as represented in FIG. 1 and FIG. 3, with thermocouples 18 or other devices for temperature measurement. If the temperature measured—in this example at the leading blade edge—exceeds a predetermined setpoint value, the amount of cooling air is increased. Conversely, the cooling air is further throttled if the material temperature measured is below the predetermined setpoint value. When realizing such a control system, the diaphragm 36 represented in FIG. 2 is advantageously installed in every cooling-air supply line. By measuring the pressure drop over the diaphragm, the mass flow of the cooling air can be determined.

What is claimed is:

1. A coolable component of a gas turbine, the component having hot gas flowing completely or partially around the component during operation of the gas turbine, the component comprising: at least one hollow space located within the component through which hollow space a coolant flows during operation of the gas turbine; a means for supplying the coolant which is connected to the at least one hollow space and forms a flow path for the coolant; at least one flow restriction means located in the flow path which is adjustable during operation of the gas turbine; the flow restriction means including a device for selectively adjusting the mass flow rate of the coolant in the flow path for the coolant; and at least one device for metering the mass flow of the coolant in the flow path for the coolant.

2. The coolable component of claim 1, wherein the device for metering the mass flow of the coolant in the flow path for the coolant is a metering orifice.

3. A coolable component of a gas turbine, the component having hot gas flowing completely or partially around the component during operation of the gas turbine, the component comprising: at least one hollow space located within the component through which hollow space a coolant flows during operation of the gas turbine; a means for supplying the coolant which is connected to the at least one hollow space and forms a flow path for the coolant; and at least one flow restriction means located in the flow path which is adjustable during the operation of the gas turbine; and wherein the adjustable flow restriction means is in the form of an adjustable diaphragm in a supply line for the cooling medium.

4. A coolable component of a gas turbine, the component having hot gas flowing completely or partially around the component during operation of the gas turbine, the component comprising: at least one hollow space located within the component through which hollow space a coolant flows during operation of the gas turbine; means for supplying the coolant and means for carrying away the coolant being connected to the at least one hollow space and forming a flow path for the coolant; and at least one flow restriction means located in the flow path which is adjustable during the operation of the gas turbine; and wherein the means for carrying away cooling medium including film-cooling holes and a platelet perforated with holes which is inserted into the component, which platelet covers at least some of the film-cooling holes, and the arrangement of holes in the platelet corresponds to the arrangement of the film-cooling holes, which platelet is further arranged in a displaceable manner in relation to the component, in such a way that the holes in the platelet variably clear through-flow cross sections of the film-cooling holes, whereby an adjustable restriction of the coolant flowing away is produced.

5. A coolable component of a gas turbine, which component has a hot gas flowing completely or partially around it during operation of the gas turbine, the component comprising: at least one hallow space in its interior, means for supplying a coolant into and out of the hollow space in a flow path for the coolant, and at least one flow restriction in the flow path for adjusting the flow of coolant during operation of the gas turbine, the component being provided with at least one temperature measuring means, wherein when the temperature measured by the temperature measuring means is different from a predetermined reference value the flow rate of coolant air is adjusted.

6. A method for controlling the mass flow of coolant of a coolable component for a gas turbine, comprising:

flowing a hot gas completely or partially around the component during operation;

flowing coolant through at least one hollow space through a flow path;

providing a means for supplying the coolant;

providing a means for carrying away the coolant;

providing a restriction means, in the flow path, which is adjustable during the operation of the gas turbine; and further including:

providing film cooling holes as the means for carrying away the coolant; and inserting a perforated platelet, having platelet holes, into the component so that the platelet covers at least some of the film cooling holes, and so that the platelet holes variably clear through-flow cross sections of the film cooling holes whereby an adjustable restriction of the coolant flowing away is produced.

7. A method for making an adjustable restriction in a component of a gas turbine, the component having hot gas flowing around the component during operation of the gas turbine, a hollow space located within the component through which hollow space a coolant flows in a flow path during operation of the gas turbine, and the component including an adjustable restriction for controlling the flow of coolant in the flow path, the method comprising: making a slit in the component, inserting a platelet in the slit, forming film cooling holes through the component at the location where the platelet has been inserted, the holes in the component and in the platelet being formed in the same operation and adjustment of the platelet relative to the component provides an adjustable restriction of the coolant flowing away through the holes in the platelet and the component.

8. A method of controlling the mass flow of coolant of a coolable component for a gas turbine, the component having hot gas flowing completely or partially around it during operation, and having a hollow space in its interior through which hollow space a coolant flows during operation, the method comprising: supplying coolant to the hollow space and carrying away the coolant from the hollow space in a flow path; the flow path having a flow restriction for controlling the flow along the flow path; providing a signal responsive to the temperature of the component material; and adjusting the flow of coolant through the restriction in the flow path in response to the temperature signal.

9. The method according to claim 8 including, controlling material temperature of the component by means of a variable cooling air supply.

* * * * *